United States Patent

[11] 3,598,973

| [72] | Inventors | Everett G. Brooks;<br>Roger D. Kaus, both of Rochester, Minn. |
|---|---|---|
| [21] | Appl. No. | 790,646 |
| [22] | Filed | Jan. 13, 1969 |
| [45] | Patented | Aug. 10, 1971 |
| [73] | Assignee | International Business Machines<br>Corporation<br>Armonk, N.Y. |

[54] TABLE LOOK-UP SALES TAX COMPUTER
7 Claims, 43 Drawing Figs.

| [52] | U.S. Cl. | 235/168, 235/156 |
|---|---|---|
| [51] | Int. Cl. | G06f 7/48 |
| [50] | Field of Search | 235/176, 177, 168, 156, 159, 160 |

[56] References Cited
UNITED STATES PATENTS

| 3,253,132 | 5/1966 | Pendleton | 235/168 |
| 3,294,960 | 12/1966 | Townsend | 235/160 |

*Primary Examiner*—Malcolm A. Morrison
*Assistant Examiner*—David H. Malzahn
*Attorney*—Sughrue, Rothwell, Mion, Zinn and MacPeak

ABSTRACT: A computer including a register containing an initially proposed trial value of sales tax for a given actual sales price, a tax matrix to determine the cutoff sales price for that trial tax, a subtractor for determining if the actual sales price is larger than the cutoff sales price, logic elements for repetitively proposing the next higher trial value if the actual sales price is larger, means to use the calculated tax if the actual sales price is not larger, and means to compute the tax as a percentage of the sales price if the highest programmed trial tax is smaller than the actual tax.

INVENTORS
EVERETT G. BROOKS
ROGER D. KAUS

BY

Sughrue, Rothwell, Mion, Zinn & Macpeak
ATTORNEYS

COMBINED TABLE LOOK-UP AND
PERCENT CALCULATOR FLOW CHART

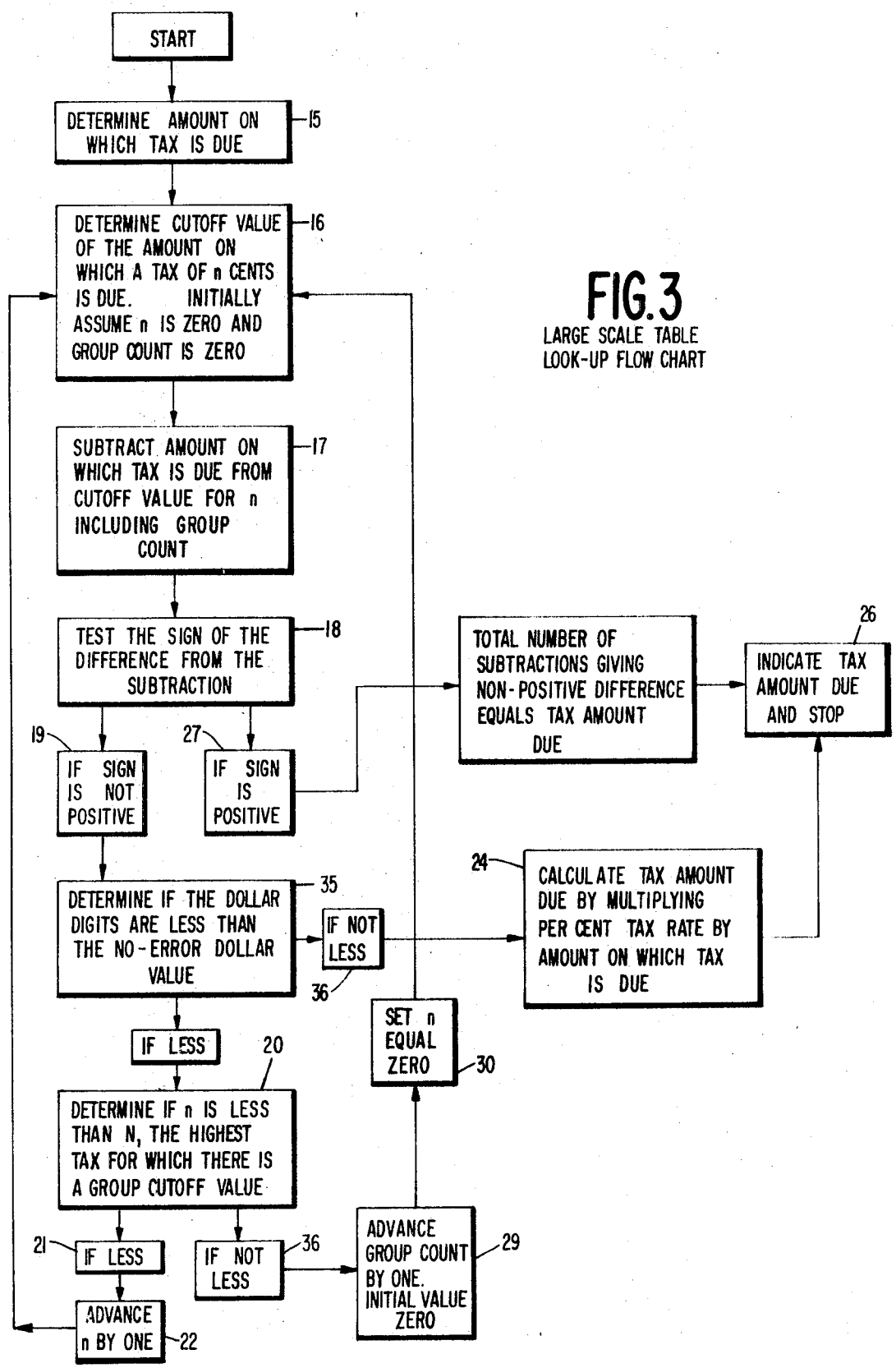
FIG.3 LARGE SCALE TABLE LOOK-UP FLOW CHART

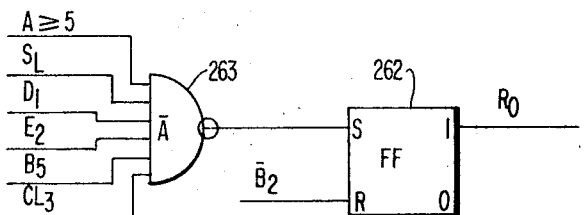
FIG.38
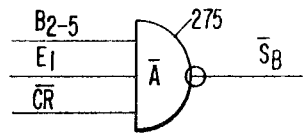
FIG.40
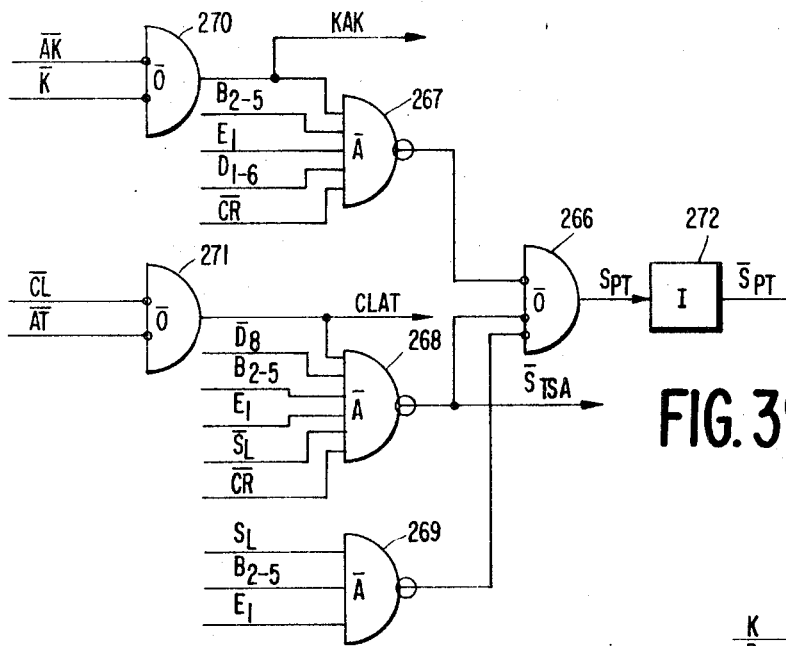
FIG.39
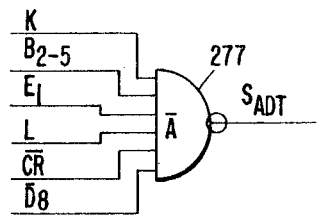
FIG.41
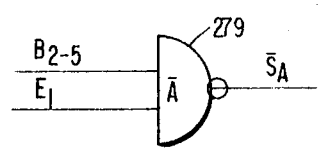
FIG.42
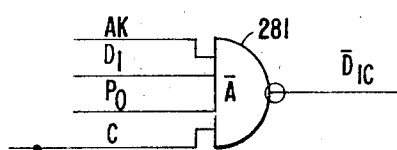
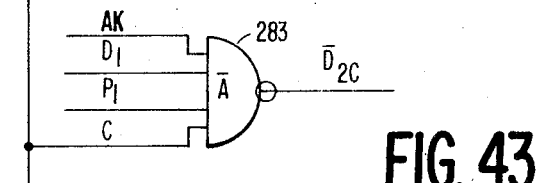
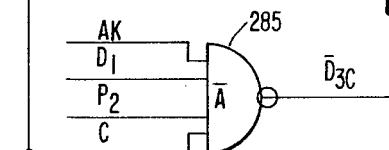
FIG.43
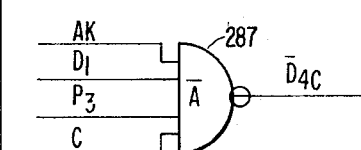

TABLE LOOK-UP SALES TAX COMPUTER

BACKGROUND OF THE INVENTION

1. Field of the Invention

The invention relates to calculators or data processing systems for determining the amount of sales tax due at the time of a sale.

2. Description of the Prior Art

A number of localities have adopted a tax on the sale of certain commodities. These taxes are nominally a certain percent of the taxable amount of sale, for example, 3 percent of the sales price. This tax is added to the sales price to determine the total amount due from the purchaser.

However, the nominal tax amount does not refer equally to all values of sales. A typical tax law might state that there is no tax on sales of $0.10 or less, a tax of $0.01 on sales from $0.11 through $0.40, a tax of $0.02 on sales from $0.41 through $0.75, a tax of $0.03 on sales from $0.76 to $1.00, and a straight 3 percent tax on all amounts over $1.00. Such a tax law is designated herein as a combined table-lookup law because it requires entry into a table for sales of $1.00 or less, and it requires percentage calculation for greater sales.

A second typical tax law repeats the basic table for a number of groups of sales prices. It might provide as follows:

| Price Range | Tax Due (cents) |
|---|---|
| $0.00—0.10 | 0 |
| 0.11—0.35 | 1 |
| 0.36—0.78 | 2 |
| 0.79—1.10 | 3 |
| 1.11—1.35 | 4 |
| 1.36—1.78 | 5 |
| 1.79—2.10 | 6 |
| 2.11—2.35 | 7 |
| 3 percent on all over $2.78 | |

This type of law is called a large scale table look-up system. The law provides that the table shall be used up to some maximum value, called the "no-error" value, beyond which calculation may legally be done by straight percentage without error.

The first group of prices has successive cutoff values $0.10, $0.35, and $0.78. The next group has the same cutoff values with 1 dollar added, i.e. $1.10, $1.35 and $1.78. The next group has an additional dollar added. The term "cutoff value" refers to the upper cutoff value of a single tax bracket. For example, the bracket of $0.11—$0.35 has a cutoff value of $0.35.

Neither the combined table look-up nor the large scale table look-up law has the same values in all jurisdictions, but the patterns are similar.

The most common prior art method of "computing" the sales tax is to have a card printed showing the ranges for various taxes up to a sale of about $20.00. These cards are placed near a cash register and referred to visually by the sales clerk after the total sale price has been rung up as a subtotal.

In the prior art there are several systems for computing sales tax according to some particular law. For example, see U.S. Pats. Nos. 3,253,132 and 3,281,794. But the prior art systems are not readily changeable when the law in a jurisdiction changes. Nor are the computing units easily variable for use in cash registers sold for use in various jurisdictions.

SUMMARY OF THE INVENTION

The present invention is an improved system for calculating sales tax on a particular sale. The system is designed to be especially easy to modify in accordance with changing sales tax regulations. The calculator can be prepared for a new jurisdiction or a new law in the old jurisdiction by making a few simple changes in electrical connections, for example, by inserting into a holder a new card printed with conductors.

The adaptability of this sales tax calculator to different regulations and methods of computing tax makes it quite applicable for use on a nationally distributed cash register.

BRIEF DESCRIPTION OF THE DRAWINGS

FIG. 3 is a flow chart for the system when operating in a large scale table look-up mode.

FIG. 38 is a block diagram of the roundoff latch circuit.

FIG. 39 is a block diagram of a circuit for deriving several logic signals.

FIG. 40 is a diagram of a gate for deriving a shift B signal.

FIG. 41 is a diagram of a gate for generating a shift signal for the ADT register.

FIG. 42 is a diagram of a gate for generating a shift signal for the A register.

FIG. 43 is a diagram of a conversion circuit.

DESCRIPTION OF THE PREFERRED EMBODIMENT

General Description

Figure 1:
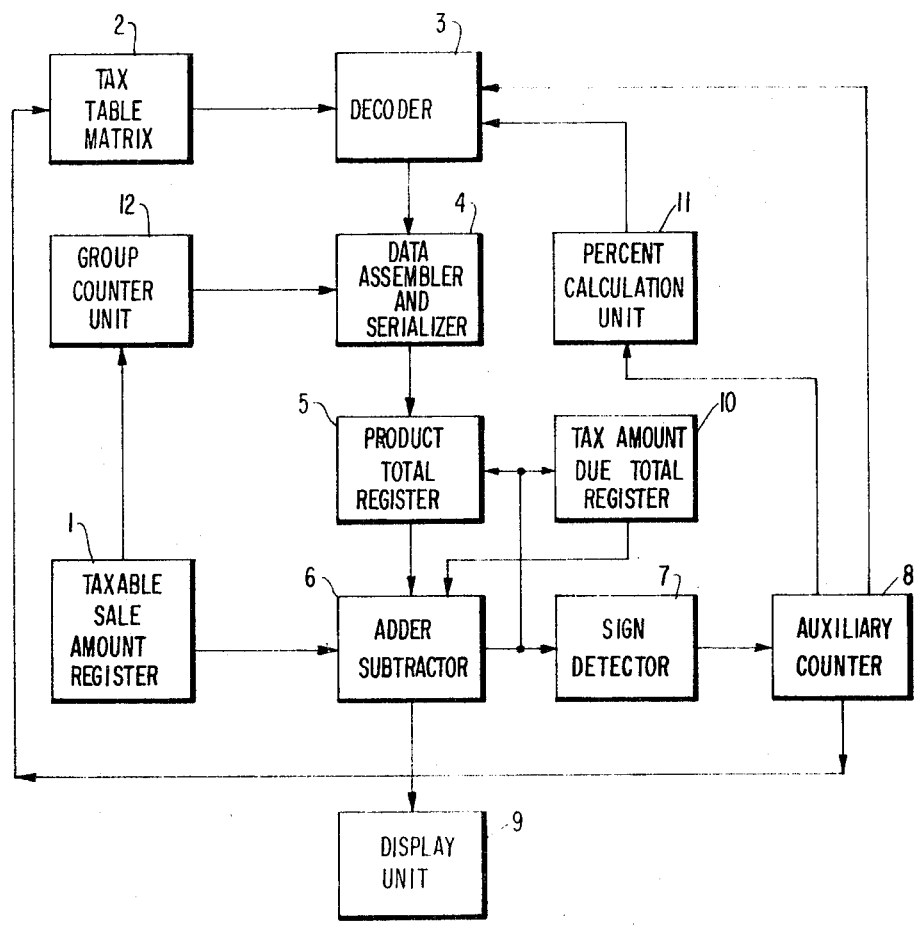
FIG. 1 is an overall block diagram of a system according to the present invention.

FIG. 1 is an overall block diagram of a system according to the present invention. The taxable amount of a sale is entered into a taxable sales amount (TSA) register 1 as the result of some system of a type well known in the prior art. The method by which the amount of sale is entered into the TSA register is prior art beyond the scope of this invention.

In the table-look-up mode of operation, the taxes on each sale amount up to, for example, 1 dollar are contained in a tax table matrix 2 in the form of cutoff values of sale amount for each tax amount. Upon appropriate keying, the lowest cutoff value from matrix 2 is read into a decoder 3. The decoder converts the cutoff value, one digit at a time, into a binary coded decimal (BCD) value and enters the BCD value, in parallel, into a data assembler and serializer 4, from which the BCD value is serially entered into a product total (PT) register 5.

The contents of the PT register and of the TSA register are then fed into an adder-subtractor unit 6, wherein the contents of the TSA register are subtracted first from the lowest upper cutoff value from the PT register.

A sign detector 7 receives an output from adder-subtractor unit 6 and determines whether or not the difference has a positive sign. If the difference is not positive, the sign detector sends a signal to an auxiliary counter 8 (initially set at zero) to advance counter 8 by 1 cent (or any other minimum) amount of money under applicable law. The updated contents of auxiliary counter 8 are applied to tax table matrix 2 to advance the matrix to the next higher cutoff value, thereby recycling the system through additional computations.

When sign detector 7 determines that the difference resulting from a subtraction of TSA contents from PT contents is positive, the tax amount due from counter 8 is placed at the input of the data assembler and serializer 4 through the decoder. The contents of the PT register 5 are then cleared and the tax amount due is entered into the PT register and corrected in a predetermined manner (explained later) if it is larger than a predetermined tax amount.

Then the tax amount due from PT register 5 and the total sale amount (source not illustrated) are added together in adder-subtractor unit 6 to produce a total amount due indication. The tax amount due total is displayed or printed out by a display unit 9.

If the tax table for the governmental region involved is a repetitive table having corresponding sets of cutoff (dime-cent) values for each successive dollar value, then the tables are repetitive groups of values. In such a governmental region, the system is used in its large scale look-up mode. A group counter logic unit 12 is provided to adjust the cutoff values for dollar values larger than those in the lowest group. In addition, a tax amount due register 10 is provided for generation of the tax amount due.

When the taxable sales amount is larger than a predetermined minimum, it becomes necessary to calculate the tax amount due by percent calculation. When the auxiliary counter reaches a predetermined value, the system initiates percent calculation by percent calculation unit 11. At the end of the percent calculation operation, the amount of tax due is stored in the PT register 5, then (optionally) added to the total sale amount before display.

Figure 2:
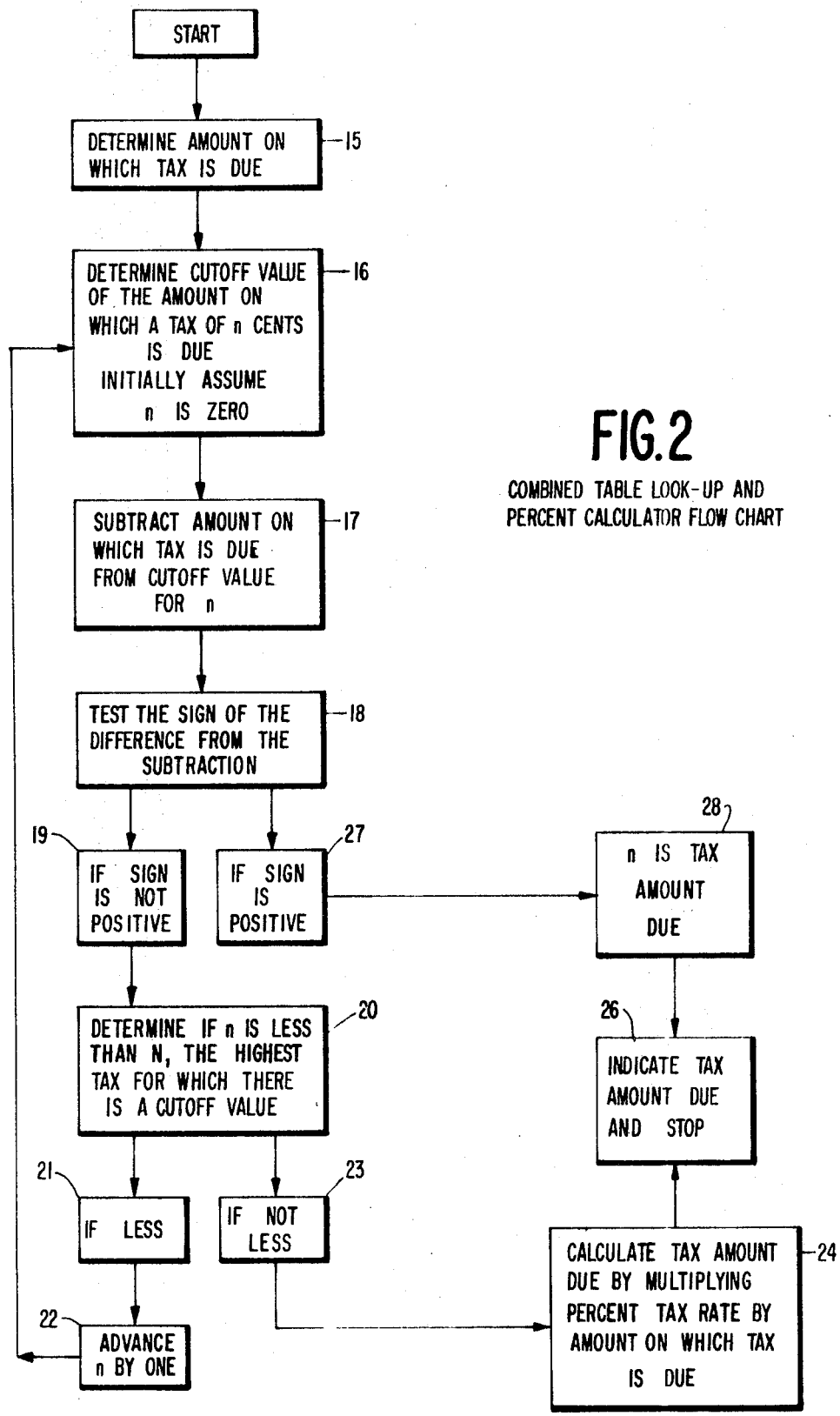
FIG. 2 is a flow chart for operation of the system in a combined table look-up and percent calculation mode.

FIG. 2 is a flow chart for the operation of the system in a combined table look-up and percent calculation mode. Table look-up is required for small amounts, for example, up to 1 dollar, with percent calculation for larger values.

The flow chart merely shows what is done, without disclosing the special purpose computer used to carry out the calculations.

First the amount of money on which a sales tax is due is determined (block 15). The next block indicates the table look-up step in which successive cutoff values are determined. For example, for amounts up to and including 10 cents, no tax may be due. If a number $n$ represents the amount of tax due for each cutoff value, then $n=0$ for a cutoff value of 10 cents. If $n$ becomes 1 the upper cutoff value may become 40 cents, indicating that for sales of 40 cents or less, a tax of 1 cent is due. The value of $n$ is initially set at zero.

Then, in block 17 the amount of money on which a sales tax is due is subtracted from the cutoff value for the given value of $n$ to determine a difference.

Next, in block 18, the sign of the difference thus obtained is tested to determine if it is positive or not positive. This is the first fork in FIG. 2.

If the sign is not positive (from the first fork, block 18) as determined in block 19, the next step is to determine (in block 20) if the value of $n$ is higher than some N, where N is the highest tax for which there is a cutoff value, before the tables call for straight percent calculation. The number $n$ is either less or not less than N. This is the second fork of FIG. 2.

If the answer from block 20 is "less" as determined by block 21, then the value of $n$ is advanced by one in block 22 and the loop is closed by return to block 16 for the next cycle.

If, at the second fork, from block 20, the answer is "not less" as determined by block 23, the next step is to calculate, in block 24, the tax amount due by straight percentage calculation. The total amount due is indicated (block 26) and the system stopped.

If, at the first fork, from block 18, the output has a sign which is positive, as determined by block 27, then the value of $n$ is taken as the tax amount due, in cents. The tax amount due is then indicated (block 26).

FIG. 3 is a flow chart for the system when operating in a large scale table look-up mode. Many of the blocks are the same as in FIG. 2. However, a group count (block 29) has been added to indicate how many full dollars (or other groups) are present in the amount on which tax is due. Each time the group count is advanced, $n$ is reset to zero (block 30) and block 16 is recycled through the range of cutoff values of dimes and cents. But advance of the group count advances the dollar cutoff value, so that the total cutoff value progressively rises until it becomes greater than the amount on which tax is due (indicated by output from block 27) or until it is determined that the amount on which tax is due is at least as large as a no-error value (blocks 35 and 36) so that the entire tax can be calculated by straight percent calculation without error.

Next some of the hardware used in a preferred embodiment of the invention will be considered.

Figure 4:
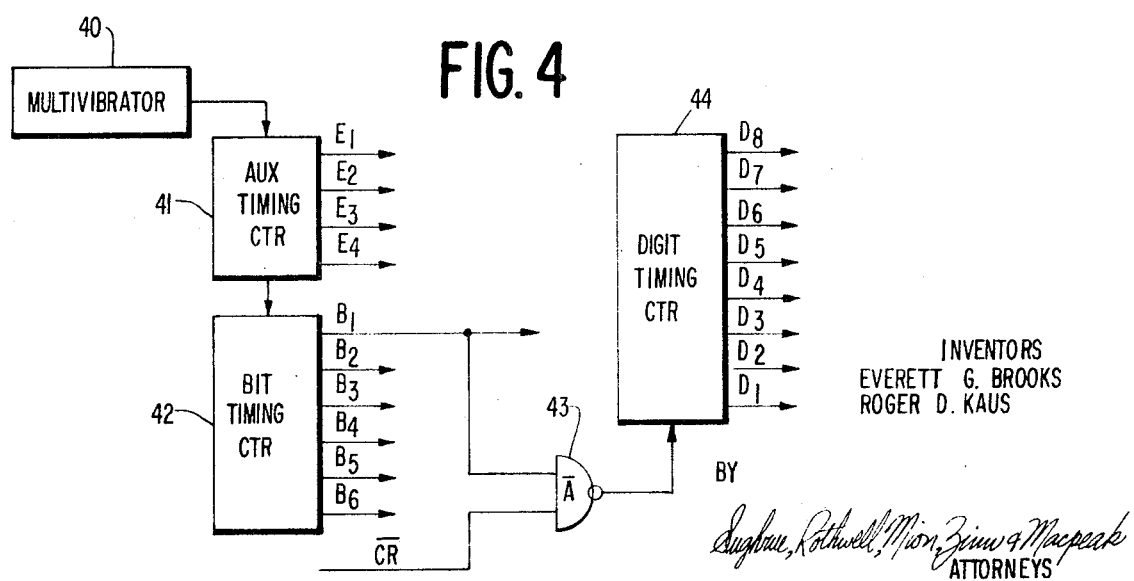
FIG. 4 is a block diagram of the timing system for the invention.

FIG. 4 is a block diagram of the timing system for the invention. A free-running multivibrator 40 finishes the basic clock pulses to a first or auxiliary timing counter 41 which may be, for example, a ring counter. Counter 41 has one up position which successively cycles through counter 41, as driven by the multivibrator, to successively produce UP signals $E_1$, $E_2$, $E_3$, $E_4$, then $E_1$, etc.

An output from timing counter 41 drives bit timing counter 42 to successively produce output signals $B_1$, $B_2$, $B_3$, $B_4$, $B_5$, $B_6$, then $B_1$, etc. The output $B_1$ is applied, as one of its two inputs, to an inverting AND gate, also called a NAND gate, 43. The other input to gate 43 is a signal $\overline{CR}$ or NOT CR. The $\overline{CR}$ type of notation, with a bar, will be used hereafter to indicate a NOT function. The signal $\overline{CR}$ is generated by the circuit of FIG. 35.

An output signal from gate 43 is used to advance a digit timing counter 44 to successively produce output signals $D_1$, $D_2$, $D_3$, $D_4$, $D_5$, $D_6$, $D_7$, $D_8$, then $D_1$, etc.

The B, D and E signals together define a cycle of 192 increments, and are thus used for timing purposes.

In the circuits which follow, the logic uses positive AND invert gates, which are called NAND gates, and negative OR invert gates, which are called NOR gates. The NAND gates are equivalent to classical AND gates with inverted outputs, and the NOR gates are equivalent to classical OR gates with inverted inputs.

Figure 5:
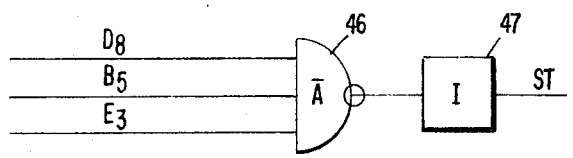
FIG. 5 is a block diagram of a system for deriving a set signal ST.

FIG. 5 is a diagram showing the derivation of a set signal ST. The signals $D_8$, $B_5$ and $E_3$ from the circuit of FIG. 4 enter a NAND gate 46 to produce an output signal which is applied to an inverter 47 (a NOT function generator) to produce at the output the set signal ST.

Figure 6:
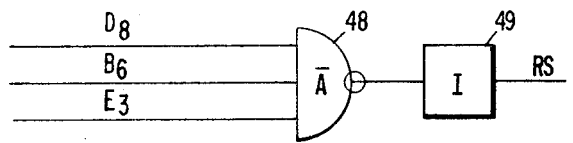
FIG. 6 is a block diagram of a system for deriving a reset signal RS.

FIG. 6 is a diagram showing the derivation of a reset signal RS. The signals $D_8$, $B_6$, and $E_3$ from the circuit of FIG. 4 enter a NAND gate 48 to produce an output signal which is applied to an inverter 49 to produce at the output the reset signal RS.

Figure 7:
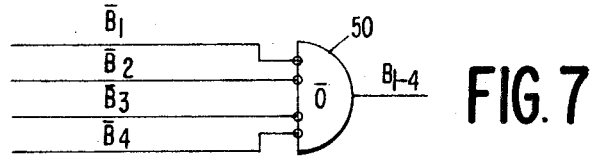
FIG. 7 is a block diagram of a system for deriving a combined bit timing signal $B_{1-4}$.

FIG. 7 is a diagram showing the derivation of a first combined bit timing signal $B_{1-4}$. An inverting OR gate 50 (hereafter called a NOR gate) receives four input signals $\overline{B_1}$, $\overline{B_2}$, $\overline{B_3}$, and $\overline{B_4}$, derived by inverting corresponding signals from FIG. 4. NOR gate 50 produces signal $B_{1-4}$.

Figure 8:
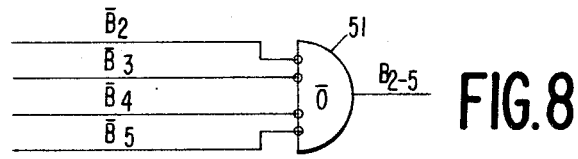
FIG. 8 is a block diagram of a system for deriving a similar combined bit timing signal $B_{2-5}$.

FIG. 8 shows the derivation of a similar combined bit timing signal $B_{2-5}$ by NOR gate 51, having inputs $\overline{B_2}$, $\overline{B_3}$, $\overline{B_4}$ and $\overline{B_5}$ derived by inverting signals from FIG. 4.

Figure 9:
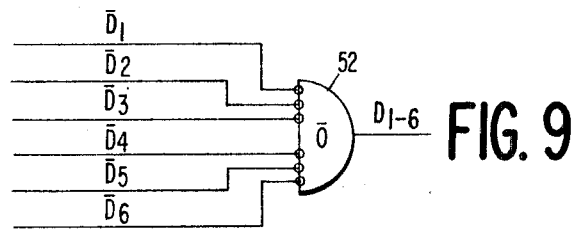
FIG. 9 is a block diagram of a system for deriving a combined digit timing signal $D_{1-6}$.

FIG. 9 is a diagram of a circuit for deriving a combined digit timing signal $D_{1-6}$ by combining, in NOR gate 52, signals $\overline{D_1}$, $\overline{D_2}$, $\overline{D_3}$, $\overline{D_4}$, $\overline{D_5}$, and $\overline{D_6}$, derived by inverting signals from FIG. 4.

Figure 10:
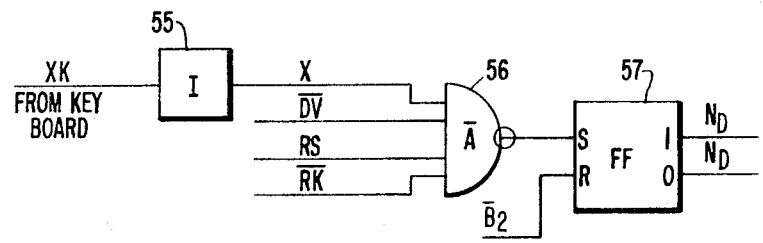
FIG. 10 is a block diagram of a circuit for initiating tax calculation.
Figure 11:
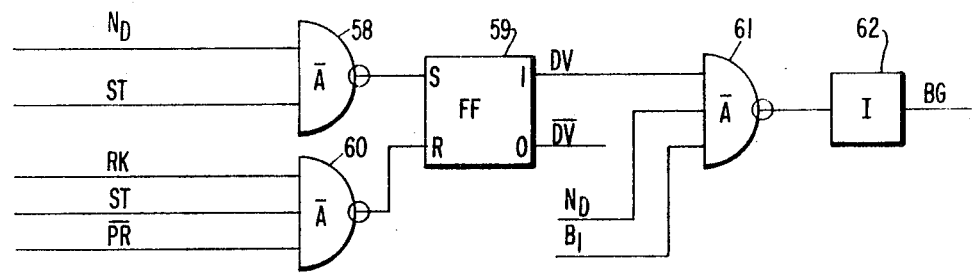
FIG. 11 is a block diagram of a further circuit for initiation of tax calculation.

FIG. 10 is a diagram of a circuit for the initiation of tax calculation. When a "CALCULATE TAX" key (not illustrated) on the cash register (not illustrated) is pressed, a calculate tax key signal XK enters the computer and into an inverter 55 wherein it is inverted to generate a CALCULATE TAX order signal X. Signals $\overline{DV}$, RS, and $\overline{RK}$ are combined with X in a NAND gate 56 to generate a signal to SET a flip-flop 57. Signal $\overline{DV}$ indicates that drive latch 59 in FIG. 11 is not ON. The signal RS comes from FIG. 6 and the signal $\overline{RK}$, indicating that the cash register keyboard has not been ordered restored, comes from FIG. 21. Signal $\overline{B_2}$ is used to reset flip-flop 57. Flip-flop 57 produces an enable drive latch signal $N_D$ when ON (after being SET) and a NOT enable drive latch signal $\overline{N_D}$ when OFF.

FIG. 11 is a diagram of a further circuit for the initiation of the tax calculation. A NAND gate 58 receives $N_D$ (from FIG. 10) and ST (from FIG. 5) to generate a SET signal for a flip-flop 59. A NAND gate 60 receives RK, indicating that the keyboard has been ordered restored (from FIG. 21), ST (from FIG. 5) and $\overline{PR}$, indicating that PRINT OUT is not being ordered (from FIG. 22) to generate a RESET signal for drive latch flip-flop 59. When flip-flop 59 is ON, the output is DV indicating that the computer should be in operation. When flip-flop 59 is off, the output is $\overline{DV}$.

A NAND gate 61 receives the DV signal, the $N_D$ signal (from FIG. 10) and a $B_1$ signal (from FIG. 4) to generate an output signal which is inverted by inverter 62 to generate the BEGIN OPERATION signal BG.

Figure 12:
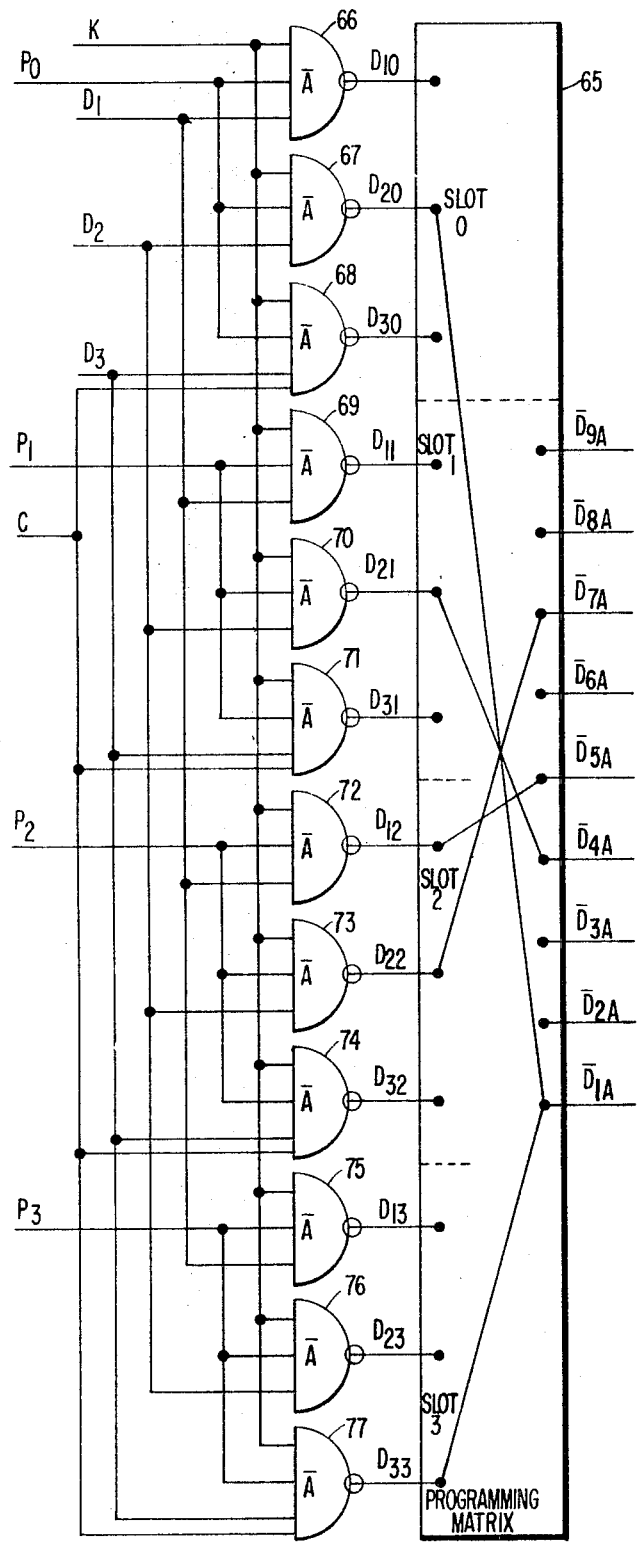
FIG. 12 is a block diagram including parts of the tax table matrix of FIG. 1.

FIG. 12 is a diagram including parts of the tax table matrix arrangement of FIG. 1. A programming matrix 65 is used to set the cutoff values for the various amounts of tax. In the illustrated matrix, the tax is set for the following table:

| Slot No | Tax | Sale Amount |
|---|---|---|
| 0 | $0.00 | $0.01—0.10 |
| 1 | 0.01 | 0.11—0.40 |
| 2 | 0.02 | 0.41—0.75 |
| 3 | 0.03 | 0.76—1.00 |

Because cutoff values are the table values of interest, the following table is entered into the matrix:

| Slot No. | Cutoff Vlaue |
|---|---|
| 0 | 0.10 |
| 1 | 0.40 |
| 2 | 0.75 |
| 3 | 1.00 |

The matrix receives, for this tax table, 12 input signals, $D_{10}$, $D_{20}$, $D_{30}$, $D_{11}$, $D_{21}$, $D_{31}$, $D_{12}$, $D_{22}$, $D_{32}$, $D_{13}$, $D_{23}$, and $D_{33}$. Taking one of these signals $D_{32}$ as an example, the numerals 32 indicate that $D_{32}$ represents digit 3 of slot 2. The cutoff value in slot 2 is $0.75, the first digit (from the right) of which is 5. Therefore the programming matrix 65 is arranged to connect the $D_{32}$ input signal to the fifth output line, thereby generating signal $\overline{D_{5A}}$. The remaining matrix connections are illustrated for the tax table, used in the example. The matrix could easily be wired for other tax tables, including additional slots where necessary. The following table shows the NAND gates feeding the matrix 65, their output and their inputs.

| NAND Gate | Output | Input | Input | Input |
|---|---|---|---|---|
| 66 | $D_{10}$ | K | $P_0$ | $D_1$ |
| 67 | $D_{20}$ | K | $P_0$ | $D_2$ |
| 68 | $D_{30}$ | K | $P_0$ | $D_3$ |
| 69 | $D_{11}$ | K | $P_1$ | $D_1$ |
| 70 | $D_{21}$ | K | $P_1$ | $D_2$ |
| 71 | $D_{31}$ | K | $P_1$ | $D_3$ |
| 72 | $D_{12}$ | K | $P_2$ | $D_1$ |
| 73 | $D_{22}$ | K | $P_2$ | $D_2$ |
| 74 | $D_{32}$ | K | $P_2$ | $D_3$ |
| 75 | $D_{13}$ | K | $P_3$ | $D_1$ |
| 76 | $D_{23}$ | K | $P_3$ | $D_2$ |
| 77 | $D_{33}$ | K | $P_3$ | $D_3$ |

Figure 19:
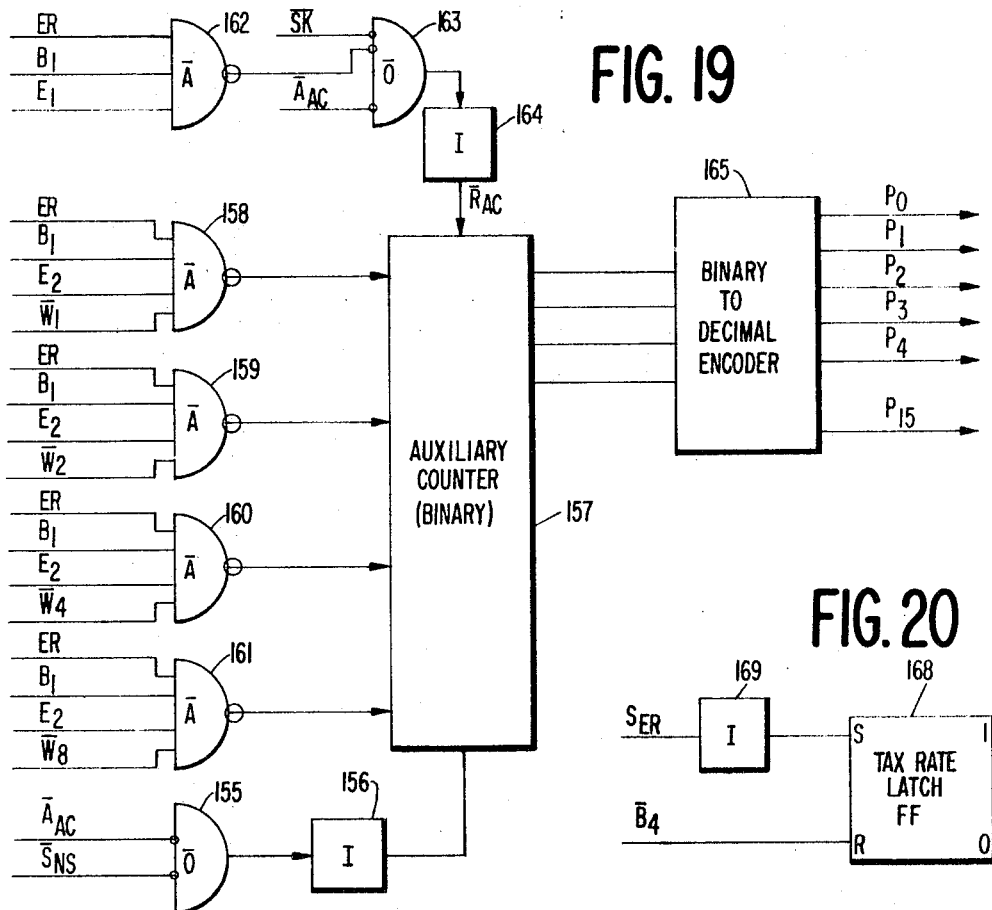
FIG. 19 is a block circuit diagram of the auxiliary counter 8 of FIG. 1.

The $P_0$, $P_1$, $P_2$ and $P_3$ signals come from a binary to decimal encoder 165 of FIG. 19. The K signal is an output from a keyboard latch 189 in FIG. 25. The $D_1$, $D_2$, and $D_3$ signals come from counter 44 in FIG. 4.

Matrix 65 produces nine output signals $\overline{D_{1A}}$, $\overline{D_{2A}}$, $\overline{D_{3A}}$, $\overline{D_{4A}}$, $\overline{D_{5A}}$, $\overline{D_{6A}}$, $\overline{D_{7A}}$, $\overline{D_{8A}}$ and $\overline{D_{9A}}$, corresponding to the decimal values of the digits in the cutoff values.

Figure 13:
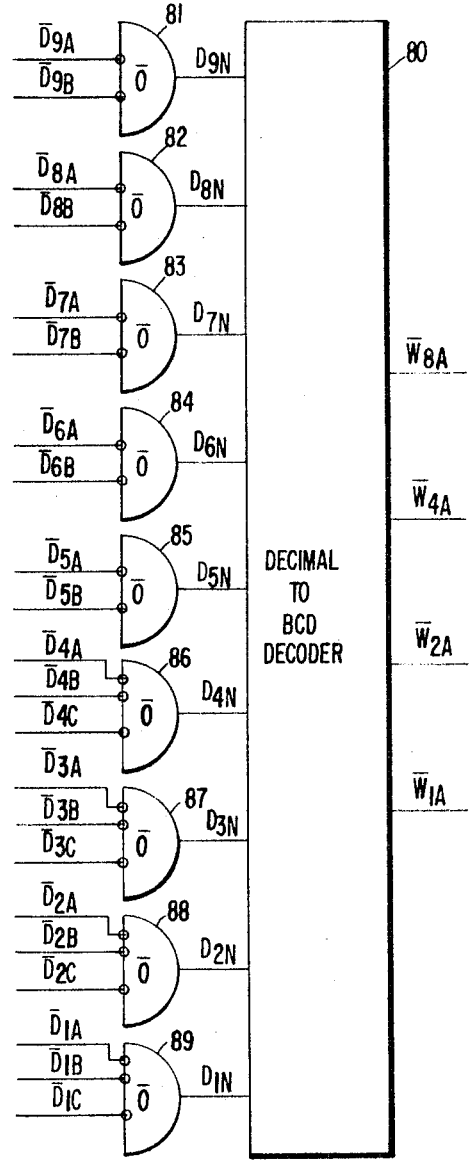
FIG. 13 is a block diagram of a decoder system as used for block 3 of FIG. 1.

FIG. 13 is a diagram of a decoder system as used for block 3 of FIG. 1. A conventional decimal to BCD decoder 80 receives 9 digital input signals $D_{1N}$—$D_{9N}$ on nine parallel input lines and produces four BCD outputs $\overline{W_{1A}}$, $\overline{W_{2A}}$, $\overline{W_{4A}}$ and $\overline{W_{8A}}$ on four parallel output lines. Each of the input lines to decoder 80 is connected to the output of an inverting OR gate, also known as a NOR gate 81—89, respectively producing signals $D_{9N}$—$D_{1N}$. The NOR gates for producing signals $D_{1N}$—$D_{9N}$ respectively receive as inputs, signals $\overline{D_{1A}}$—$\overline{D_{9A}}$ from the circuit of FIG. 12 and also signals $\overline{D_{1B}}$—$\overline{D_{9B}}$ from percent calculation unit 11, as will be explained later in connection with FIG. 18.

Additionally NOR gates 86—89 receive input signals $\overline{D_{1C}}$—$\overline{D_{4C}}$, which serve to read values from the auxiliary counter 8 into the product total register 5 through decoder 3 and data assembler and serializer 4 when the combined table look-up mode is employed. Signals $\overline{D_{1C}}$—$\overline{D_{4C}}$ are derived from the circuit of FIG. 43 as will be illustrated. The NOR gates function to couple any signals present to the inputs of decoder 80.

Figure 14:
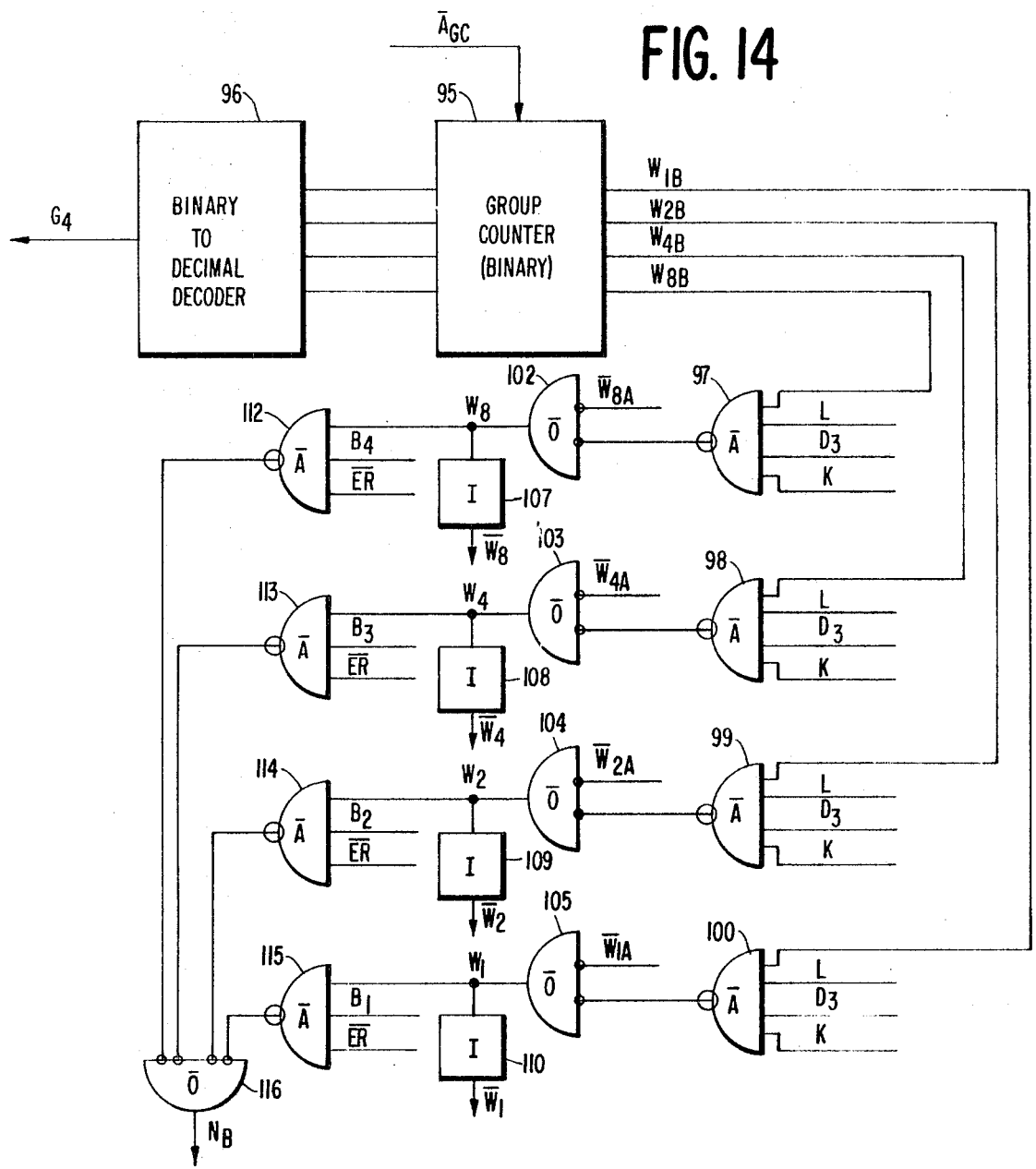
FIG. 14 is a diagram including data assembler and serializer 4 and part of decoder 3 from FIG. 1.

FIG. 14 is a diagram including data assembler and serializer 4 and part of decoder 3 from FIG. 1. A group counter 95, which operates in the large scale table look-up mode, supplies signals $W_{1B}$, $W_{2B}$, $W_{4B}$ and $W_{8B}$ which represent in binary form, the value of the dollar digit of the taxable sale amount. The output of this counter is also provided to a binary to decimal decoder 96 to provide a single output signal $G_4$ to indicate the existence of a group four count. A group four count is used as an example only. The number of groups and slots is open to choice. Decoder 96 may be an AND gate receiving $\overline{W_{1B}}$, $\overline{W_{2B}}$, $W_{4B}$ and $\overline{W_{8B}}$ and producing a $G_4$ output.

Four NAND gates 97, 98, 99, and 100 each have four input signals. Each of the gates receives K, $D_3$ and L, the latter being a wired-in signal for use in governmental regions requiring large scale table look-up to correctly determine the taxes. Gates 97, 98, 99 and 100 receive, as their respective fourth inputs, signals $W_{8B}$, $W_{4B}$, $W_{2B}$, and $W_{1B}$.

The outputs of NAND gates 97—100 are respectively applied to an input of NOR gates 102—105. The other input signals to NOR gates 102—105 are respectively signals $\overline{W_{8A}}$, $\overline{W_{4A}}$, $\overline{W_{2A}}$, and $\overline{W_{1A}}$ from the circuit of FIG. 13. The outputs from NOR gates 102—105 are respectively signals $W_8$, $W_4$, $W_2$, and $W_1$ which are applied to respective inverters 107— 110 to respectively generate signals $\overline{W_8}$, $\overline{W_4}$, $\overline{W_2}$, and $\overline{W_1}$. Signals $W_8$, $W_4$, $W_2$, and $W_1$ are respectively applied to inputs of AND gates 112, 113, 114, and 115. Another signal applied to these NAND gates is $\overline{ER}$, indicating that a tax rate latch is not set, and coming from the circuit of FIG. 20.

A third input to each of the NAND gates is a timing signal for gating the $W_1$, $W_2$, $W_3$ and $W_4$ signals. The timing signals for gates 115, 114, 113 and 112 are respectively $B_1$, $B_2$, $B_3$ and $B_4$. The outputs from the four NAND gates are applied to a NOR gate 116 to provide a serial form of the data, as $N_B$, for entry into the product total register 139 in FIG. 16.

Figure 15:
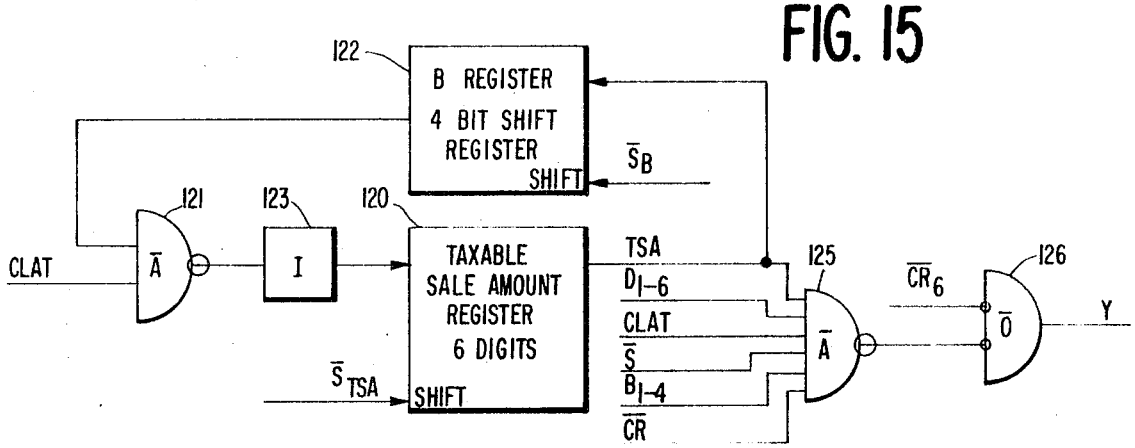
FIG. 15 is a block diagram of block 1 from FIG. 1.

FIG 15 is a schematic block diagram of block 1 from FIG. 1. The taxable sale amount from a transaction is entered into 6-Digit TSA register 120. Whenever the system is in any calculate mode or the arithmetic table look-up mode of operation, a CLAT signal from the circuit of FIG. 39 gates open a NAND gate 121. Then register 120 and a 4-bit shift register 122, called the B register, form a closed loop. A TSA (taxable sales amount) signal read from one end of register 120, is stored in register 122 for a brief interval as controlled by the relative timing of the two shift signals $\overline{S_{TSA}}$ and $\overline{S_B}$, and is then shifted out of the B register, through NAND gate 121 and inverter 123 and back to the input end of TSA register 120.

The TSA signal is applied as one of six inputs to a NAND gate 125. The other five inputs are timing signals $D_{1-6}$ from the circuit of FIG. 9, the CLAT gating signal, an $\overline{S_L}$ signal from FIG. 37, a $B_{1-4}$ timing signal from the circuit of FIG. 7, and a $\overline{CR}$ derived in the course of computing the $CR_6$, "6-correct" signal in the circuit of FIG. 35.

Figure 35:
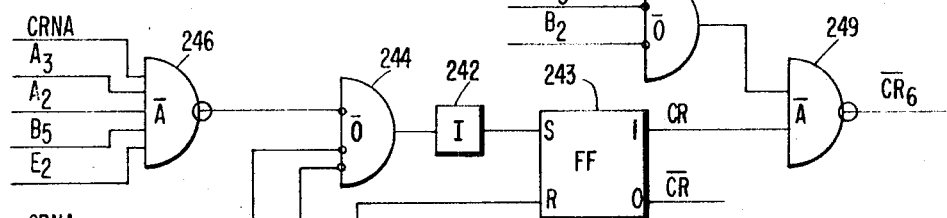
FIG. 35 is a block diagram of the logic elements for six correction of BCD arithmetic operations.

The output from NAND gate 125 is applied to one input of a NOR gate and the "NOT 6-CORRECT" signal $\overline{CR_6}$ from FIG. 35 is applied to the other input. The NOR gate output is Y and represents the taxable sales amount as applied to the adder-subtractor input.

Figure 16:
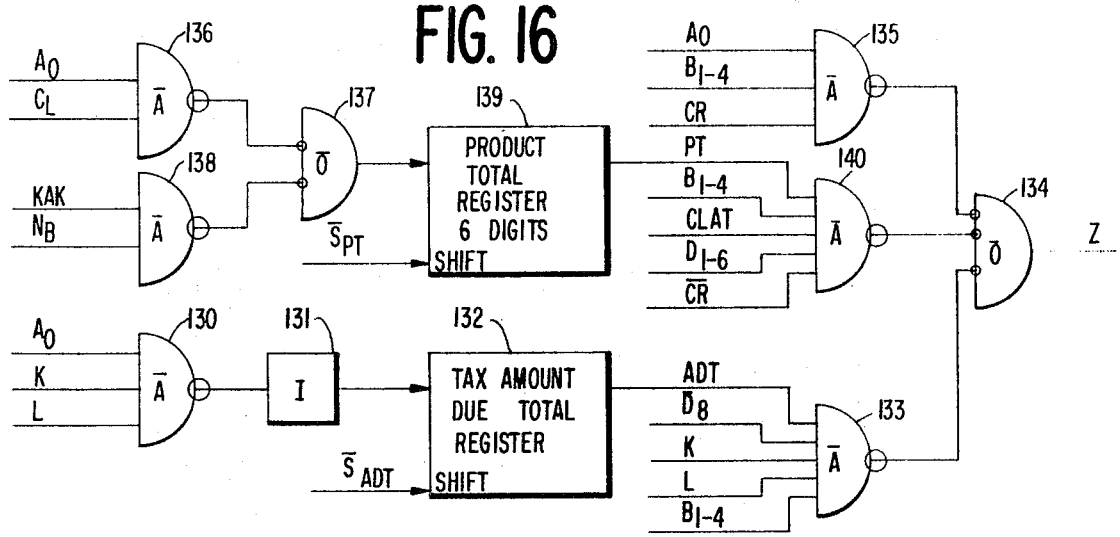
FIG. 16 is a block diagram illustrating blocks 5 and 11 from FIG. 1 plus some auxiliary logic elements.

FIG. 16 illustrates parts of blocky 5 and 10 from FIG. 1 as well as some auxiliary logic elements not illustrated in FIG. 1. During a large scale table look-up operation, NAND gate 130 and inverter 131 form an AND gate gated ON by coincident signals K and L to pass an $A_0$ signal from 4-bit A shift register 146 from FIG. 17. The $A_0$ signal is placed in a tax amount due total (ADT) register 132 and shifted from there by $\overline{S_{ADT}}$ signal into an input of NAND gate 133 as an ADT signal. Gate 133 is gated by K and L signals and timed by $\overline{D_8}$ and $B_{1-4}$ signals to provide an output to NOR gate 134.

Another NAND gate 135 is gated by correction signal CR and timed by signal $B_{1-4}$ to pass signal $A_0$ to another input of NOR gate 134.

A NAND gate 136 is gated by a calculate signal CL to pass signal $A_0$ to an input of NOR gate 137. Another NAND gate 138 is gated by a signal KAK to pass a signal $N_B$ from gate 116 of FIG. 14 to the other input of NOR gate 137. The output from the NOR gate is entered into a product total (PT) register 139.

Under the control of a shift signal $\overline{S_{PT}}$, the contents of the PT register are shifted out to one input of a NAND gate 140, which is gated by signal $\overline{CR}$ from FIG. 35 and signal CLAT from FIG. 39 and is timed by timing signals $D_{1-6}$ and $B_{1-4}$ to pass an output to the third input of NOR gate 134.

Figure 17:
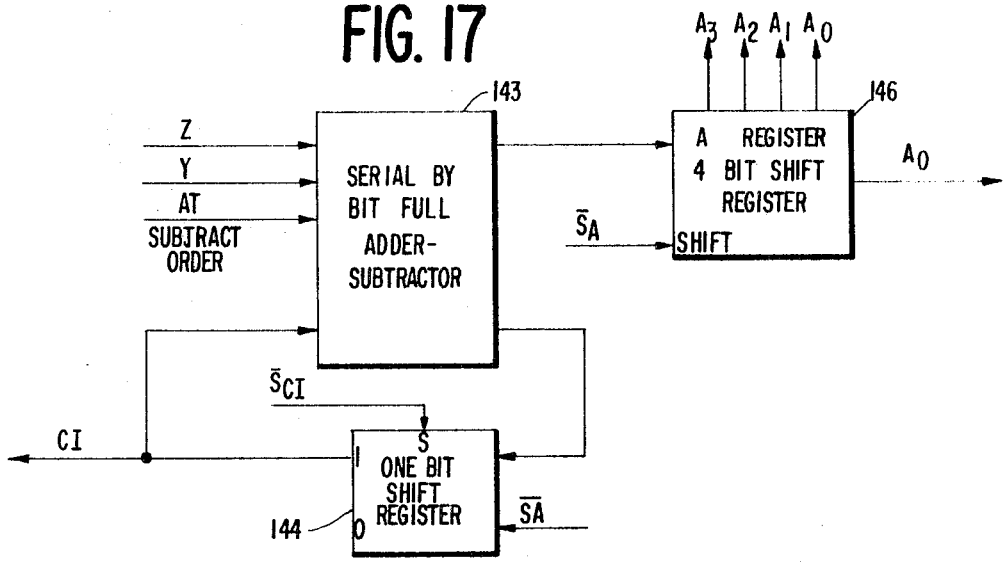
FIG. 17 is a block diagram of the adder-subtractor unit and some peripheral circuitry.

The output signal Z from NOR gate 134 is applied to an input terminal of adder-subtractor 143 of FIG. 17 to serve as an input signal.

FIG. 17 is a block diagram of the adder-subtractor unit and peripheral circuitry. A serial by bit full adder-subtractor 143 receives signal Y from the circuit of FIG. 15 and signal Z from the circuit of FIG. 16, as well as a signal AT from the circuit of FIG. 26 ordering the adder-subtractor to subtract.

A carry-borrow output signal CBO is provided from the adder-subtractor 143 output to the RESET input of a carry-in register 144. Register 144 serves as a link in a feedback loop to reenter data into the adder-subtractor after operation on it.

Figure 27:
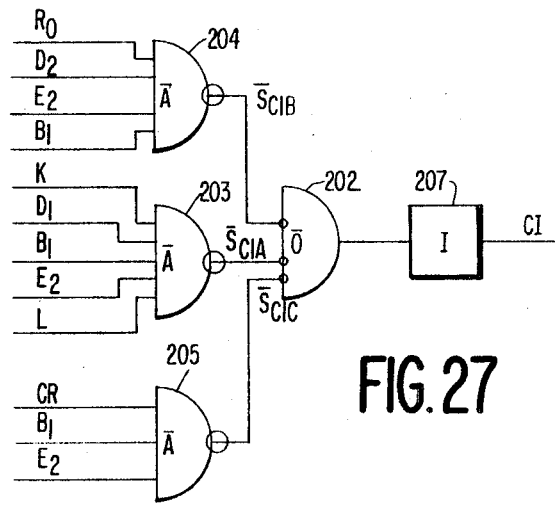
FIG. 27 is a block diagram of a circuit for deriving a set carry in signal.

At the end of each bit time, the $\overline{S_A}$ shifts the CBO bit into the 1-bit register which provides the carry-borrow in (CI) for the next bit time intervals. The $\overline{S_{CI}}$ signal from FIG. 27 provides a DC set condition on register 144 when a digit is to be increased by one.

The output signal from adder-subtractor 143 is applied to a 4-bit A shift register 146, and is shifted through register 146 by a shift signal $\overline{S_A}$. This provides signals $A_0$, $A_1$, $A_2$ and $A_3$ from the shift register, needed primarily by the correction and 6-correct logic circuit of FIG. 35. The output $A_0$ from register 146 is recirculated back to inputs of the circuit of FIG. 16.

Figure 18:
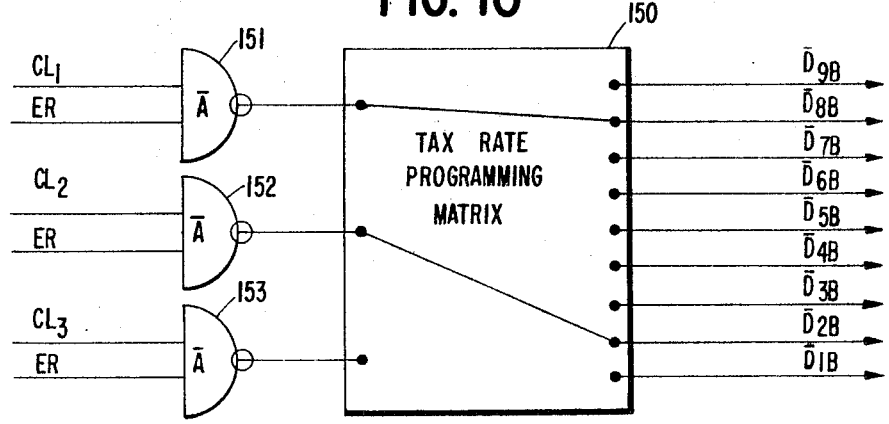
FIG. 18 illustrates a tax rate programming matrix.

FIG. 18 illustrates a tax rate programming matrix 150 energized by a down signal from only one of three NAND gates 151, 152, and 153, to choose one output signal from the group of $\overline{D_{1B}}$, $\overline{D_{2B}}$, $\overline{D_{3B}}$, $\overline{D_{4B}}$, $\overline{D_{5B}}$, $\overline{D_{6B}}$, $\overline{D_{7B}}$, $\overline{D_{8B}}$, and $\overline{D_{9B}}$. Each NAND gate receives an energize tax rate signal ER, and gates 151, 152, and 153 also respectively receive signals $CL_1$, $CL_2$, and $CL_3$, from FIGS. 30, 31 and 32, indicating the stage of calculation. Programming matrix 150 can be constructed in various ways, as for example, with a printed circuit card with fixed conductors or jumper wires between the corresponding input and output terminals for the operand tax rate. FIG. 18 shows a system programmed for a 2.8 percent tax rate, where digit one (i.e. 8) of the tax rate, from gate 151, is wired to the $\overline{D_{8B}}$ pin. Digit two (i.e. 2) of the tax rate, from gate 152, is wired to the $\overline{D_{2B}}$ pin and digit three (i.e. 0) of the tax rate, from gate 153, is unattached. A change in tax rate is accomplished by changing the printed circuit card.

FIG. 19 is a block circuit diagram of the auxiliary counter 8 of FIG. 1 including peripheral elements. The auxiliary counter is advanced by two signals: first $\overline{S_{NS}}$ from FIG. 28, which indicates that the subtraction has resulted in a negative result during a table-look-up operation; and secondly, $\overline{A_{AC}}$ from FIG. 33, which provides a count of the slots during a percent calculation operation. The two signals $\overline{S_{NS}}$ and $\overline{A_{AC}}$ are applied through a NOR gate 155 and an inverter 156 to the input of the auxiliary binary counter 157.

Another set of inputs to the auxiliary binary counter comes from the data assembler in FIG. 14. Four NAND gates 158—161 provide inputs to the separate stages of auxiliary counter. Each NAND gate is gated by energized tax rate signal ER and timing signals $B_1$ and $E_1$ to pass signals from the data assembler. Gates 158, 159, 160 and 161 respectively pass signals $\overline{W_1}$, $\overline{W_2}$, $\overline{W_4}$ and $\overline{W_8}$ to the auxiliary counter.

A NAND gate 162 receives the energized tax rate signal ER and timing signals $B_1$ and $E_1$ and applies an output signal to the input of a NOR gate 163. The NOR gate also receives advance auxiliary counter signal $\overline{A_{AC}}$ and SET key board latch signal $\overline{SK}$ to generate, via inverter 164, a RESET auxiliary counter signal $\overline{R_{AC}}$. Signal $\overline{R_{AC}}$ is applied to counter 157 for RESET.

Outputs from the auxiliary counter are provided to a binary to decimal encoder. Encoder 165 produces signals $P_0$, $P_1$, $P_2$, etc., representing the number of cents tax counted by the auxiliary counter. These signals are applied in FIG. 12 to adjust the cutoff value for the next slot in order to successively reach the true tax.

The remaining figures show circuits for deriving control logic functions needed in the operation of the invention.

Figure 20:
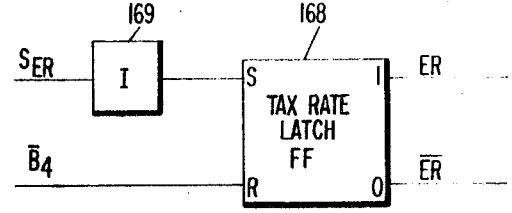
FIG. 20 is a block diagram of the energize tax rate latch.

FIG. 20 is a diagram of the energize tax rate latch. A flip-flop 168 is set by a SET rate signal $S_{ER}$ applied through an inverter 169 to the SET terminal of flip-flop 168. The $S_{ER}$ signal is derived from the circuit of FIG. 30. Flip-flop 168 provides complementary energized tax rate output signals ER and $\overline{ER}$.

Figure 21:
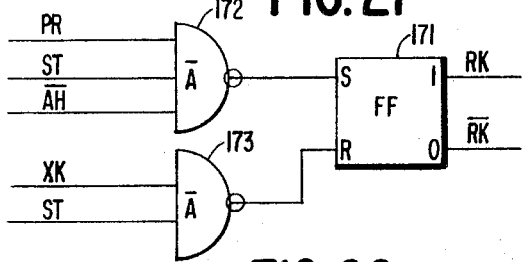
FIG. 21 is a block diagram of the restore keyboard latch circuit.

FIG. 21 is a block diagram of a restore keyboard latch circuit. A flip-flop 171 receives a SET signal from the output of a NAND gate 172, which is driven at its inputs by print signal PR from FIG. 22, set signal ST from FIG. 5 and arithmetic operation mode signal $\overline{AH}$ from FIG. 23. The RESET terminal of flip-flop 171 is connected to the output of a NAND gate 173 which is energized by tax calculate key signal XK and set signal ST. Flip-flop 171 provides complementary restore keyboard signals RK and $\overline{RK}$.

Figure 22:
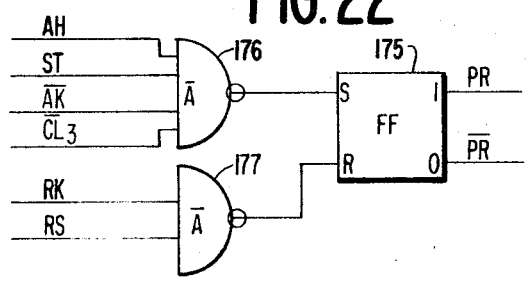
FIG. 22 is a block diagram of a print latch circuit.

FIG. 22 is a block diagram of a print latch circuit. A flip-flop 175 receives a SET signal from the output of a NAND gate 176, which is driven at its inputs by arithmetic operation mode signal AH, set signal ST, arithmetic correct latch signal AK from FIG. 24, and third stage calculation signal $\overline{CL_3}$ from FIG. 32. Flip-flop 175 is RESET by the output from NAND gate 177, which receives as input signals, restore keyboard signal RK and reset signal RS. The flip-flop provides complementary print output signals PR and $\overline{PR}$.

Figure 23:
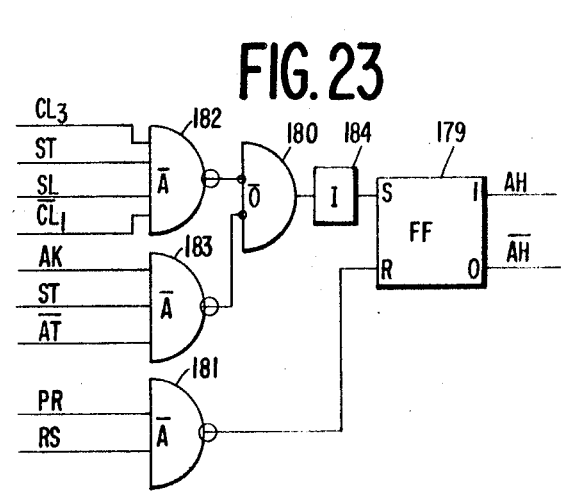
FIG. 23 is a block diagram of an arithmetic mode latch circuit.

FIG. 23 is a block diagram of an arithmetic mode latch circuit. A flip-flop 179 receives a SET signal from a NOR gate 180 via an inverter 184 and a RESET signal from a NAND gate 181. Outputs from NAND gates 182 and 183 provide the inputs to the OR gate 180. NAND gate 182 is energized by third stage calculation signal $CL_3$, set signal ST, a shift latch signal $S_L$ and a first stage calculation signal $\overline{CL_1}$. NAND gate 183 is energized by arithmetic correct latch signal AK, set signal ST, and arithmetic table look-up signal $\overline{AT}$ from FIG. 26. NAND gate 181 is energized by print signal PR and reset signal RS. Flip-flop 179 produces complementary arithmetic mode output signals AH and $\overline{AH}$.

Figure 24:
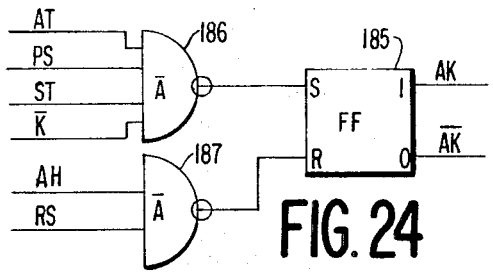
FIG. 24 is a block diagram of an arithmetic correct latch circuit.

FIG. 24 is a block diagram of an arithmetic correct latch circuit. A flip-flop 185 receives a SET signal from the output of a NAND gate 186, which receives as input signals an arithmetic tale look-up signal AT, a positive sign signal PS from FIG. 28, a SET signal ST, and a keyboard latch signal $\overline{K}$ from FIG. 25. Flip-flop 185 produces complementary arithmetic correct latch signals AK and $\overline{AK}$.

Figure 25:
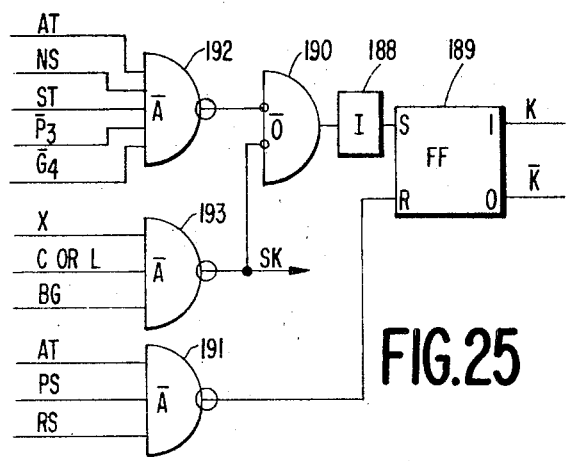
FIG. 25 is a block diagram of a keyboard latch circuit.

FIG. 25 is a block diagram of a keyboard latch circuit. A flip-flop 189 receives a SET signal from a NOR gate 190 via an inverter 188 and a RESET signal from a NAND gate 191. NOR gate 190 receives signals from the outputs of NAND gates 192 and 193. NAND gate 191 receives as input signals the arithmetic table look-up signal AT, the positive sign signal PS and the reset signal RS.

NAND gate 192 receives as input signals the signal AT, the negative sign signal NS, the set signal ST, the $\overline{P_3}$ output from the circuit of FIG. 19, and the group four signal $\overline{G_4}$ (only used for large scale table look-up) from the circuit of FIG. 14. NAND gate 193 receives as input signals the tax calculation key signal X, the begin program signal BG and either a combined table look-up signal C or a large scale table look-up mode signal L, depending upon which signal is wired into the calculator for long term use, to determine the mode of operation used. Flip-flop 189 provides complementary keyboard latch signals K and $\overline{K}$.

Figure 26:
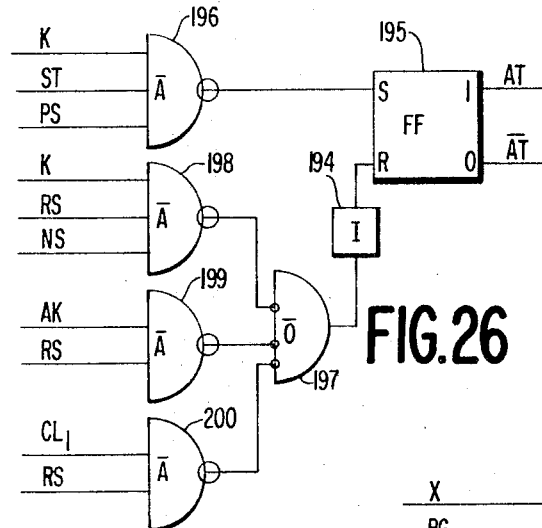
FIG. 26 is a block diagram of an arithmetic table look-up latch circuit.

FIG. 26 is a block diagram of an arithmetic table look-up latch system. A flip-flop 195 receives a SET signal from a NAND gate 196 and a RESET signal from a NOR gate 197 via inverter 194. NOR gate 197 receives inputs from NAND gates 198, 199, and 200. NAND gate 196 receives as input signals the keyboard latch signal K, the set signal ST and the positive sign signal PS. NAND gate 198 receives as input signals the reset signal RS, the negative sign signal NS and the signal K. NAND gate 199 receives as input signals the arithmetic correct signal AK and the reset signal RS. NAND gate 200 receives as input signals the first mode calculate signal $CL_1$, and the reset signal RS. Flip-flop 195 produces complementary arithmetic table look-up signals AT and $\overline{AT}$.

FIG. 27 is a circuit for deriving a set carry in signal $\overline{S_{CI}}$. A NOR gate 202 receives input signals $\overline{S_{CIA}}$, $\overline{S_{CIB}}$ and $\overline{S_{CIC}}$ respectively from a NAND gate 203, from a NAND gate 204, and from a NAND gate 205. NAND gate 203 receives as input signals the keyboard latch signal K, the large scale table look-up signal L and timing signals $D_1$, $B_1$, and $E_2$. NAND gate 204 receives as input signals the roundoff signal RO from the circuit of FIG. 38 and timing signals $D_2$, $E_2$, and $B_1$. NAND gate 205 receives as inputs the correction signal CR from FIG. 35 and timing signals $B_1$ and $E_2$. The output of NOR gate 202 is applied to an inverter 207 and is inverted to become signal $\overline{S_{CI}}$.

Figure 28:
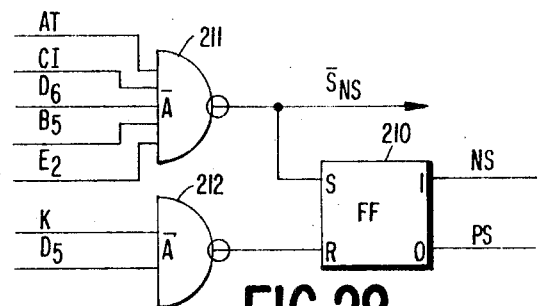
FIG. 28 is a block diagram of the negative sign positive sign latch circuit.

FIG. 28 is a block diagram of the negative sign-positive sign latch circuit used in determining the sign of the difference after a subtraction. The term "negative sign" might also be called a "NOT positive sign". A flip-flop 210 receives a SET signal from a NAND gate 211 and a RESET signal from a NAND gate 212. Gate 211 receives as input signals the arithmetic table look-up signal AT, a carry in signal CI from the carry in trigger of FIG. 17, and timing signals $D_6$, $B_5$ and $E_2$. Gate 212 receives as input signals the keyboard latch signal K and a timing signal $D_5$.

The output of NAND gate 211 is a set negative sign signal $\overline{S_{NS}}$. The flip-flop 210 provides a negative sign signal NS and a positive sign signal PS.

Figure 29:
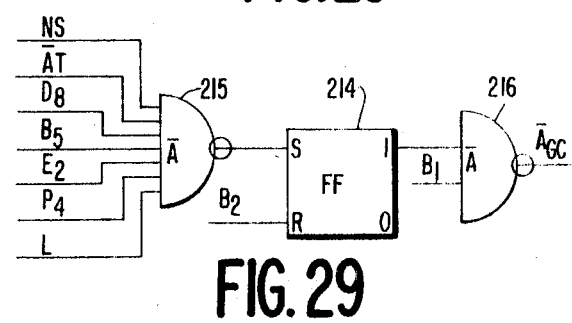
FIG. 29 is a block diagram of a group counter control logic circuit.

FIG. 29 is a block circuit diagram of a group counter control logic circuit. A flip-flop 214 receives a SET input signal from a NAND gate 215 and as a RESET input signal, timing signal $\overline{B_2}$. NAND gate 215 receives as input signals the negative sign signal NS, an arithmetic table look-up signal $\overline{AT}$, the $P_4$ output from the circuit of FIG. 19, the large scale table look-up (wired-in) signal L, and timing signals $D_8$, $B_5$ and $E_2$. Flip-flop 214 produces an ON signal which is applied to one input of a NAND gate 216. A $B_1$ timing signal is applied to the other input of gate 216 to produce an advance group counter output signal $\overline{A_{GC}}$.

Figure 30:
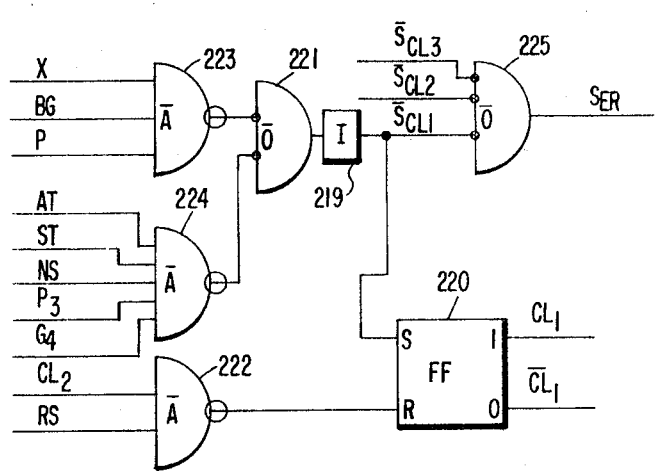
FIG. 30 is a block diagram of a first stage calculation latch circuit and a circuit for deriving a set energize-tax-rate latch signal.

FIG. 30 is a block circuit diagram of a first stage calculation latch and a circuit for deriving a set energize-tax-rate latch signal $S_{ER}$. A flip-flop 220 is provided with a SET input from a NOR gate 221 via inverter 219 and a RESET input from a NAND gate 222. NOR gate 221 receives input signals from NAND gates 223 and 224. NAND gate 222 receives as input signals a second stage calculation latch signal $CL_2$ from FIG. 31 and the reset signal RS.

NAND gate 223 receives as input signals the tax calculation signal X, the begin program signal BG and the straight percent calculation signal P, which may be wired in instead of the C or L signals.

NAND gate 224 receives as input signals the arithmetic table look-up signal AT, the set signal ST, the negative sign signal NS, the $P_3$ signal from FIG. 19, and the group four signal $G_4$ (used only for large scale table look-up).

The output signal from inverter 219 is a SET first calculation mode latch signal $\overline{S_{CL1}}$, and is applied to set flip-flop 220. Flip-flop 220 produces complementary first calculation mode output signals $CL_1$ and $\overline{CL_1}$.

Signal $\overline{S_{CL1}}$ and SET second and third calculation mode latch signals $\overline{S_{CL2}}$ and $\overline{S_{CL3}}$ from FIGS. 31 and 32 (discussed below) are applied to a NOR gate 225 to generate a signal $S_{ER}$.

Figure 31:
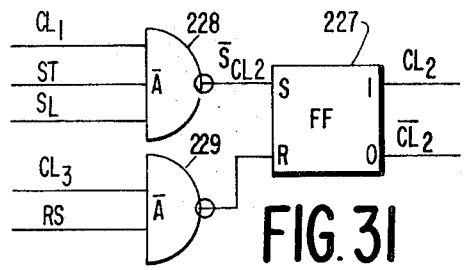
FIG. 31 is a block diagram of a second stage calculation latch circuit.

FIG. 31 is a block circuit diagram of a second stage calculation latch. A flip-flop 227 receives a SET input $\overline{S_{CL2}}$ from a NAND gate 228 and a RESET input from a NAND gate 229. NAND gate 228 receives as input signals a first stage calculation latch signal $CL_1$, a set signal ST, and a shift latch signal $S_L$. NAND gate 229 receives as input signals the third stage calculation latch output signal $CL_3$ and the reset signal RS. Flip-flop 227 provides complementary second stage calculation mode latch signals $CL_2$ and $\overline{CL_2}$.

Figure 32:
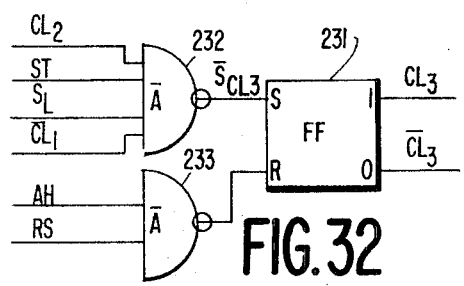
FIG. 32 is a block diagram of a third stage calculation latch circuit.

FIG. 32 is a block circuit diagram of a third stage calculation latch. A flip-flop 231 receives a SET signal $\overline{S_{CL3}}$ from a NAND gate 232 and a RESET signal from a NAND gate 233.

NAND gate 232 receives as input signals the signals $CL_2$ and $\overline{CL_1}$, the set signal ST, and the shift L signal $S_L$. NAND gate 233 receives as input signals the arithmetic mode signal AH and the reset signal RS. Flip-flop 231 produces complementary third stage calculation mode latch signals $CL_3$ and $\overline{CL_3}$.

Figure 33:
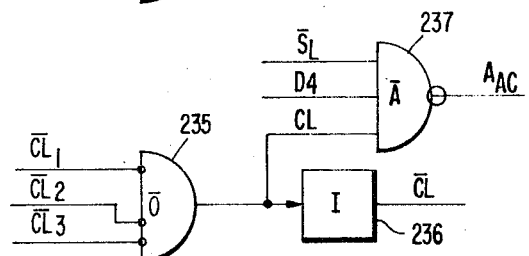
FIG. 33 is a block diagram of a calculation mode and advance auxiliary counter logic circuit.

FIG. 33 is a block circuit diagram of a calculation mode and advance auxiliary counter logic circuit. A NOR gate 235 receives input signals $\overline{CL_1}$, $\overline{CL_2}$, and $\overline{CL_3}$ from FIGS. 30, 31 and 32, and produces a calculation mode output signal CL which is inverted by an inverter 236 to produce another (inverted) calculation mode output signal $\overline{CL}$.

The signal CL is applied to an input of a NAND circuit 237, together with shift L signal $\overline{S_L}$ and timing signal $D_4$ to produce an advance auxiliary counter signal $A_{AC}$.

Figure 34:
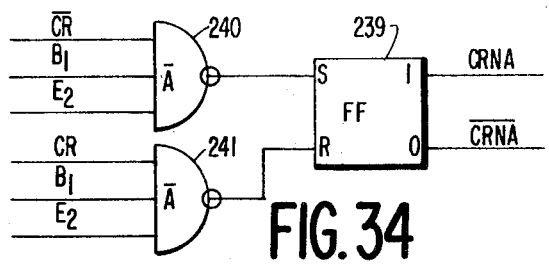
FIG. 34 is a block diagram of a circuit for deriving an enable correction signal.

FIG. 34 is a block diagram of a circuit for deriving an enable correction signal used to prevent six correction (discussed below in connection with FIG. 35) of an already corrected result. Flip-flop 239 receives a SET input from a NAND gate 240 and a RESET input from a NAND gate 241. NAND gate 240 receives as input signals a correction signal $\overline{CR}$ from FIG. 35 and timing signals $B_1$ and $E_2$. NAND gate 241 receives a correction signal CR and timing signals $B_1$ and $E_2$. Flip-flop 239 provides complementary enable correction signals $\overline{CRNA}$ and CRNA.

FIG. 35 illustrates the logic elements used for six correction of BCD arithmetic operations. Six correction of addition requires adding a BCD six to a digit when that digit exceeds nine, ignoring the binary carry, and generating a digit carry to the next higher order binary coded digit.

A flip-flop 243 receives a SET signal from a NOR gate 244 via inverter 242 and a RESET signal from a NAND gate 245. NOR gate 244 receives input signals from NAND gates 246, 247, and 248.

NAND gate 245 receives as inputs, signal $\overline{CRNA}$ from FIG. 34 and timing signals $B_5$ and $E_2$.

NAND gates 246, 247 and 248 each receive as inputs the signal CRNA from FIG. 34 and timing signals $B_5$ and $E_2$. Gates 246 and 247 receive respectively signals $A_2$ and $A_1$; each also receives signal A3. NAND gate 248 receives the carry in signal CI. Flip-flop 243 produces complementary correction output signals CR and $\overline{CR}$.

The signal CR is applied to one input of a NAND gate 249. The other input to gate 249 is from a NOR gate 250 having timing inputs $\overline{B_2}$ and $\overline{B_3}$. NAND gate 249 produces the six correct signal $\overline{CR_6}$.

Figure 36:
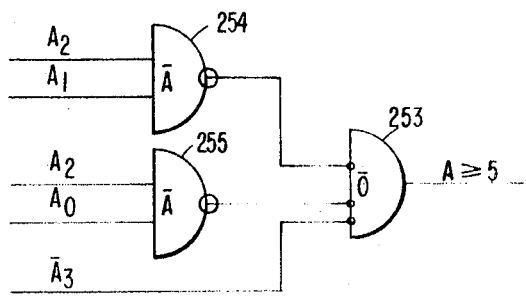
FIG. 36 is a block diagram of a circuit for determining if the contents of the A register are five or greater.

FIG. 36 is a block circuit diagram of a logic circuit for determining if the contents of the A register are five or greater. If the contents are eight or more, $A_3$ is a signal, so $\overline{A_3}$ is applied to a NOR gate 253. If the contents are seven or six, both $A_2$ and $A_1$ will be up, so a NAND gate 254 is provided with $A_1$ and $A_2$ signals and its output provided to NOR gate 253. If the contents are five both $A_2$ and $A_0$ will be up, so a NAND gate 255 is provided with $A_2$ and $A_0$ signals and its output applied to NOR gate 253. Gate 253 provides an output signal $A \geq 5$ when the contents of register A are greater than or equal to five.

Figure 37:
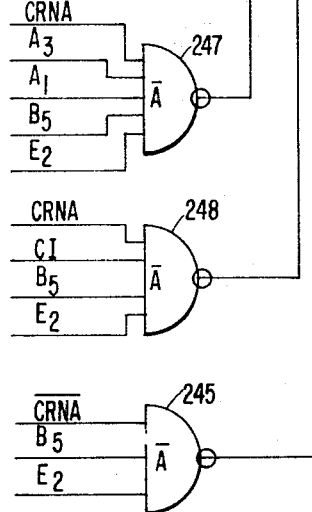
FIG. 37 is a block diagram of a circuit for deriving the shift L signal.

FIG. 37 is a block diagram of a circuit for deriving the shift L signal $S_L$. A flip-flop 257 receives a SET signal from a NAND gate 258 and a RESET signal from a NAND gate 259. Gate 258 receives the calculate signal CL, the $P_{15}$ signal from FIG. 19 and timing signals $D_1$, $B_1$ and $E_3$. Gate 259 receives as one input the RESET signal RS and as the other input a signal from a NOR gate receiving a calculate signal $\overline{CL}$ and an arithmetic correct signal $\overline{AK}$. Flip-flop 257 produces complementary shift L signals $S_L$ and $\overline{S_L}$.

FIG. 38 is a block diagram of the roundoff latch circuit. A flip-flop 262 receives a SET signal from a NAND gate 263 and a timing signal $\overline{B_2}$ as a RESET signal. NAND gate 263 receives as input signals the signal $A \geq 5$, the shift L signal $S_L$, the third stage calculation signal $CL_3$ and timing signals $D_1$, $E_2$ and $B_5$. Flip-flop 262 produces a roundoff signal RO when ON.

FIG. 39 is a block diagram of a circuit for deriving several logic signals. A NOR gate 266 receives an input from each of three NAND gates 267, 268 and 269. NAND gate 267 receives a correction signal $\overline{CR}$, a combined KAK signal from a NOR gate 270, and timing signals $B_{2-5}$, $E_1$, and $D_{1-6}$. NOR gate 270 derives signal KAK by combining input signals $\overline{K}$ and $\overline{AK}$.

NAND gate 268 receives as input signals a combined signal CLAT from a NOR gate 271, a shift L signal $S_L$, a correction signal $\overline{CR}$ and timing signals $D_8$, $B_{2-5}$, and $E_1$ to generate a shift signal $\overline{S_{TSA}}$ for the taxable sale amount (TSA) register. NOR gate 271 generates signal CLAT by combining input signals $\overline{CL}$ and $\overline{AT}$.

NAND gate 269 receives as input signals the shift L signal $S_L$ and timing signals $B_{2-5}$, and $E_1$.

The NOR gate 266 combines its inputs to generate a shift signal $S_{PT}$ for the product total (PT) register. The signal $S_{PT}$ is inverted by an inverter 272 to generate a complementary shift signal $\overline{S_{PT}}$.

FIG. 40 is a diagram of a NAND gate 275 for generating a shift signal $\overline{S_B}$ for the B register. NAND gate 275 receives a correction signal $\overline{CR}$ and timing signals $E_1$ and $B_{2-5}$.

FIG. 41 is a diagram of a NAND gate 277 for generating a shift signal $\overline{S_{ADT}}$ for the amount due total (ADT) register. Gate 277 receives as input signals keyboard latch signal K, large scale look-up (wired in) signal L, correction signal $\overline{CR}$ and timing signals $B_{2-5}$, $E_1$ and $\overline{D_8}$.

FIG. 42 is a diagram of a NAND gate 279 for generating a shift signal $\overline{S_A}$ for the A register. The inputs are timing signals $B_{2-5}$ and $E_1$.

FIG. 43 is a block diagram of a circuit for converting the outputs $P_0$, $P_1$, $P_2$ and $P_3$ from binary to decimal encoder 165 of FIG. 19 to form for use by decimal to BCD decoder 80 of FIG. 13.

Four NAND gates 281, 283, 285 and 287 each receive an arithmetic correct signal AK, wired in combined table look-up signal C, and timing signal $D_1$. Additionally, gates 281, 283, 285 and 289 respectively, receive signals $P_0$, $P_1$, $P_2$ and $P_3$ to generate signals $\overline{D_{1C}}$, $\overline{D_{2C}}$, $\overline{D_{3C}}$ and $D_{4C}$.

OPERATION

The invention has three general modes of operation: Combined table look-up, large scale table look-up, and straight percent calculation, denoted respectively by more or less permanently wired-in signals C, L and P, depending upon the legally required method of computing sales tax in the locality where a system according to the invention is used.

The operation of the combined table look-up system, explained briefly in connection with FIG. 2, can now be more clearly understood with reference to the disclosure of one embodiment of a system according to the invention for carrying out the necessary calculations.

The signal K marks the beginning of a series of operations comprising entry of a cutoff value into the PT register, acting as a "scratch pad" accumulator, while clearing the previous contents of the PT register. In programming the cutoff values into the system, each slot is assigned three NAND gates; for example, slot 0 is assigned gates 66—68 in FIG. 12. There is one such gate for each digit order of the cutoff value. The digit orders of each slot, that is digits 1, 2 and 3 are selected by the K signal together with respective signals $D_1$, $D_2$ and $D_3$. The slot number is stored by the auxiliary counter 157, in FIG. 19, and the outputs $P_0$, $P_1$, $P_2$, etc. from the binary to decimal encoder 165 designate the slot from which the cutoff value is to be taken.

The programming matrix 65, in FIG. 12, assigns a decimal value to the gate outputs, matrix 65 is preferably arranged to be easily replaceable as tax rates change.

The decimal values from matrix 65 are converted to BCD format in decoder 80, and are serialized for entry into the product total register by gates 112—115. The serialized signal $N_B$ enters the PT register. When the cutoff value is entered into the PT register, a signal AT is generated.

The signal AT marks the beginning of a series of arithmetic operations comprising subtracting the taxable sale amount in the TSA register 120 from the PT register contents in register 139 utilizing adder-subtractor 143, and testing the sign of the difference. Latch 210 generates a positive sign signal PS if the cutoff value is larger than the taxable sale amount (TSA) and generates a negative sign NS if the cutoff value is not larger than the TSA.

The keyboard latch 189 generates a new K signal if the negative sign signal NS is present and the last slot has not already been entered, designated hereby $P_3$. The signal K causes the upper cutoff value to be stepped by one slot and the computation recycled.

If the positive sign signal PS is present, the latch of FIG. 24 generates an AK signal to start an AK series of operations explained below.

If the negative sign signal NS is present when the auxiliary counter also contains the upper slot member $P_3$, then NAND gate 224 sets latch 220 to generate the first stage calculation signal $CL_1$. This signal begins a $CL_1$ series of operations explained below.

The signal AK marks the beginning of a series of operations comprising clearing the contents of the PT register, entering into the PT register the tax amount due from the auxiliary counter, and correcting the tax amount due if greater than $0.09. Correction comprises converting from binary to BCD format.

The signal $CL_1$ marks the beginning of a first stage calculation series of operations. Entry into this series means that the amount of the sale was greater than the highest cutoff value of the applicable tax tables, thereby requiring straight percentage calculation of sales tax. In the $CL_1$ algorithm, the taxable sale amount (TSA) is repetitively added to the PT a number of times corresponding to the lowest order digit of the tax rate, and shifted right one digit order after the additions are complete. The second order $CL_2$ signal is then generated.

The signal $CL_2$ causes the TSA to be repetitively added to the PT a number of times corresponding to the second order digit of the tax rate and the PT register is shifted right one digit order. The $CL_3$ signal is then generated.

The $CL_3$ signal causes the TSA to be repetitively added to the PT a number of times corresponding to the third order digit of the tax rate, shifting the PT one place right and rounding off. The PT then contains the tax amount due. The AH signal is then generated.

The signal AH marks the beginning of an addition step in which the tax amount due from the PT register is added to the total sale amount (not shown), utilizing adder-subtractor 143, obtaining the net balance due from the customer. The PR signal is then generated.

The PR signal causes printout or display of the tax amount due.

In the large scale table look-up system, the slots are repetitively arranged by groups. As in the combined table look-up system, a K signal starts system operation. When the highest cutoff value of the group has been reached, the binary to decimal encoder 165 may be, for example, an output $P_3$, marking the highest slot of the lowest group. The next negative sign resets the auxiliary counter 157 to zero. But a special tax amount due total (TADT) counter 132 is increased by 1 cent after each NS signal, keeping the useful count of tax slots passed. A group counter 95 provides a number to be used for the dollar digit value of the cutoff value. Once a cutoff value is entered into the pPT register, the AT signal is generated as in the previous operation mode.

The AT signal is used for subtraction as previously, and is used as before to generate the keyboard latch signal K except that the group 4 signal $\overline{G_4}$ (used as an example only of a group signal which could be used) is also used by latch 189 to indicate when the highest necessary group has been used. When $\overline{G_4}$ goes down, indicating that $G_4$ has been reached, the next K signal will not be generated.

The AK signal is generated and used as previously done in the combined table look-up mode.

If the negative sign signal NS still exists when signals $P_3$ and $G_4$ indicate that the upper slot of the last group has been reached, then NAND gate 224 of FIG. 30 sets the latch 220, generating signal $CL_1$. The remaining calculate and print signals follow in the previous order.

While the preferred embodiment has been shown using primarily NAND and NOR logic, AND and OR logic are also usable. NOR circuits followed by inverters have been illustrated for ease of understanding at places where DOT OR or straight connection of lines might also work. Many other arrangements of computers are possible to carry out the logic described herein.

While the invention has been particularly shown and described with reference to preferred embodiments thereof, it will be understood by those skilled in the art that various changes in form and details may be made therein without departing from the spirit and scope of the invention.

What We claim is:

1. A calculator for calculating the amount of sales tax due under rules which require the tax to incrementally increase each time the amount of a taxable sale exceeds the predetermined upper cutoff value of a lower tax slot, there being a number of contiguous tax slots, each assigned a tax and a cutoff value of amount of taxable sale comprising:
   a. first means for providing a first signal having the numerical value of the amount of taxable sale,
   b. second means for providing a second signal having the numerical value of the cutoff value of a chosen one of the tax slots,
   c. selection means for controlling said second means to cause an initially chosen one of the tax slots to be the slot having the lowest cutoff value,
   d. indication means responsive to said first and second signals for generating an indication of a first type if the numerical value of the taxable sale represented by said first signal is larger than the numerical value of the cutoff value represented by said second signal and for providing an indication of a second type if the value represented by said first signal is not larger than the value represented by said second signal.
   e. wherein said selection means is responsive to indications of said first type for causing said second means to step up a slot to provide a second signal having the numerical value of the cutoff value of the tax slot next above the previously chosen tax slot,
   f. means responsive to an indication of said second type for stopping the stepping of said second means, and
   g. means responsive to said selection means and to said indication means for providing a numerical indication of the number of times said selection means has been stepped upon the occurrence of an indication of said second type to provide an indication of the amount of sales tax due.

2. A calculator according to claim 1 further comprising addition means responsive to said indication of the amount of sales tax due and to said first signal for providing an output indication of the total amount of money due for the taxable sale plus sales tax.

3. A calculator as defined in claim 1 wherein the tax slots are arranged in a plurality of groups, the number of slots in each group being uniform, the difference between cutoff values of corresponding tax slots in adjacent groups being one dollar, and further comprising means responsive to said second means and to said indication means for determining that the upper cutoff value in a group has been reached without the occurrence of an indication of said second type, for increasing the dollar digit of the cutoff values by one and setting the cents digits thereof to zero, and for causing the selection means to step said second means through the corresponding slots of the next higher group.

4. A calculator according to claim 3 further comprising means responsive to the choice by said selection means of a cutoff value of a predetermined maximum value and to the absence of an indication of said second type for calculating the sales tax due as a percentage of the taxable sale.

5. A calculator according to claim 1 wherein said first and second signals represent the respective numerical values of the amount of taxable sale and the cutoff value by the respective digital values of the signals and wherein said indication means further comprises:
   a. a subtraction means for subtracting the digital value of one of said first and second signals from the digital value of the other of said first and second signals to derive a difference indication, and
   b. means for detecting the sign of said difference indication for generating said indication of a first type and said indication of a second type according to said sign.

6. A calculator according to claim 1 wherein said second means provides only one group of second signals representing a corresponding one group of tax slot cutoff values, and in which the stepping of said second means is stopped at the upper cutoff value of said one group if it proceeds so far.

7. A calculator according to claim 1 further comprising means responsive to the choice by said selection means of a cutoff value of a predetermined maximum value and to the absence of an indication of said second type for calculating the sales tax due as a percentage of the taxable sale.

UNITED STATES PATENT OFFICE
CERTIFICATE OF CORRECTION

Patent No. 3,598,973     Dated August 10, 1971

Inventor(s) EVERETT G. BROOKS et al

It is certified that error appears in the above-identified patent and that said Letters Patent are hereby corrected as shown below:

| | | |
|---|---|---|
| Col. 1, line 37 | - | "2.36 - 2.78    8" (entire line omitted) |
| Col. 6, lines 50-55 | - | sub C's not printed clearly |
| Col. 7, line 8 | - | "AND" should be "NAND" |
| line 41 | - | "blocky" should be "blocks" |
| Col. 11, lines 5-6 | - | "$\overline{CRNA}$ and CRNA" should be "CRNA and $\overline{CRNA}$" |
| Col. 12, line 20 | - | "$D_4C$" should be "$\overline{D_4C}$" |
| Col. 13, line 47 | - | "pPT" should be "PT" |

Signed and sealed this 25th day of April 1972.

(SEAL)
Attest:

EDWARD M. FLETCHER, JR.
Attesting Officer

ROBERT GOTTSCHALK
Commissioner of Patents